April 6, 1926.

G. A. SALINS 1,579,399

MACHINE FOR TREATING CINEMATOGRAPHIC FILMS

Filed Nov. 14, 1922     7 Sheets-Sheet 4

GEORGES AUGUSTIN SALINS
INVENTOR

By *[signature]* his Attorney

April 6, 1926.
G. A. SALINS
1,579,399
MACHINE FOR TREATING CINEMATOGRAPHIC FILMS
Filed Nov. 14, 1922 — 7 Sheets-Sheet 5
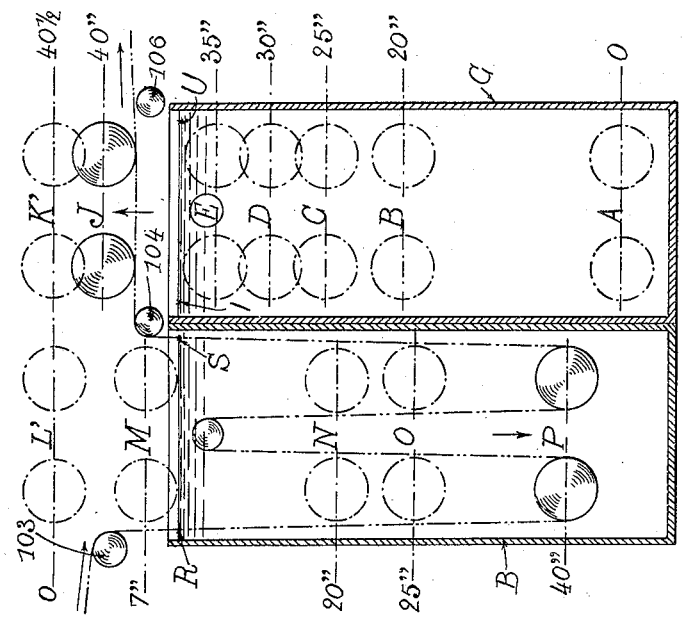
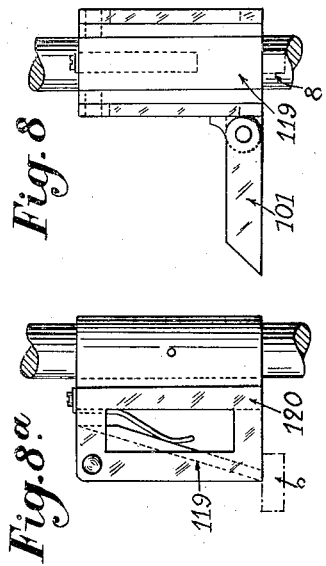
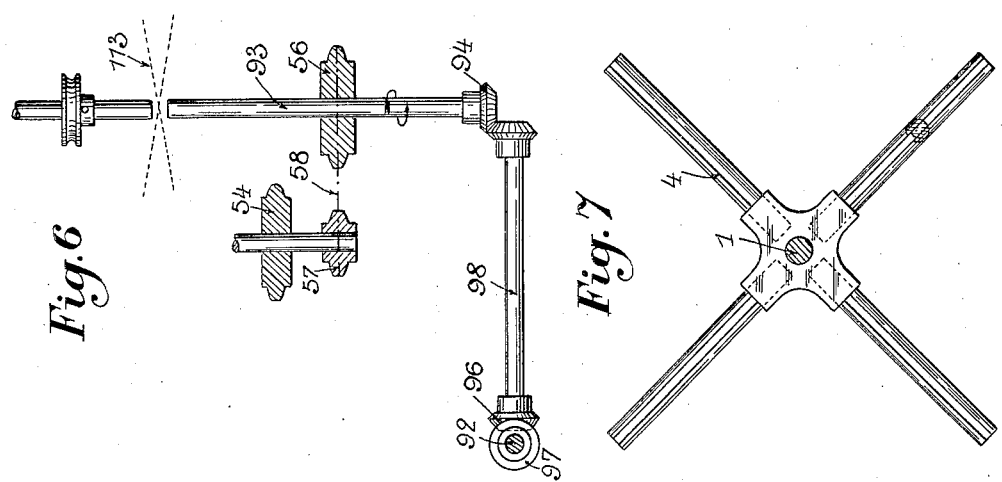
GEORGES AUGUSTIN SALINS
INVENTOR
By *[signature]*
his Attorney April 6, 1926.
G. A. SALINS
1,579,399
MACHINE FOR TREATING CINEMATOGRAPHIC FILMS
Filed Nov. 14, 1922
7 Sheets-Sheet 6
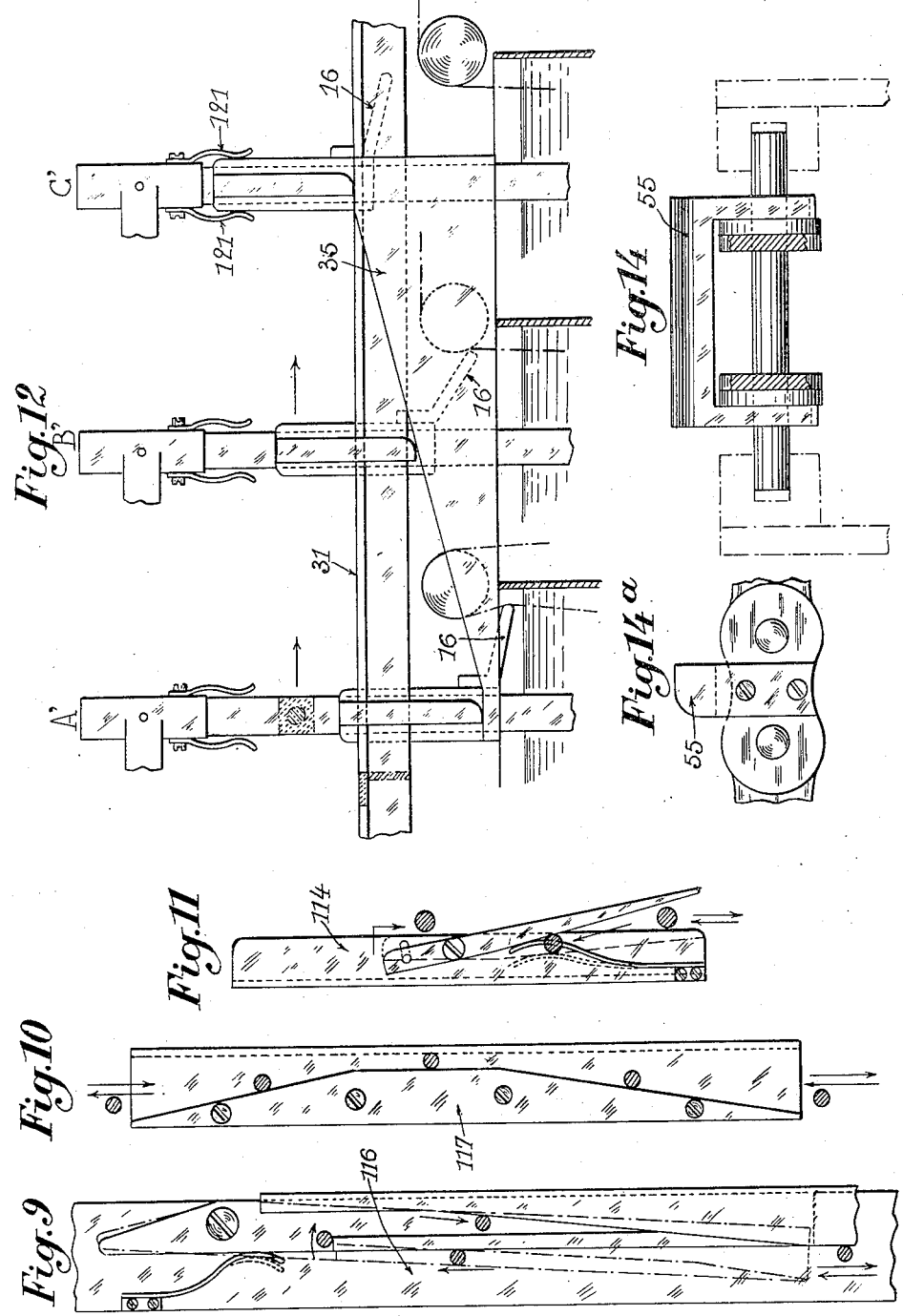
GEORGES AUGUSTIN SALINS
INVENTOR
By
his Attorney

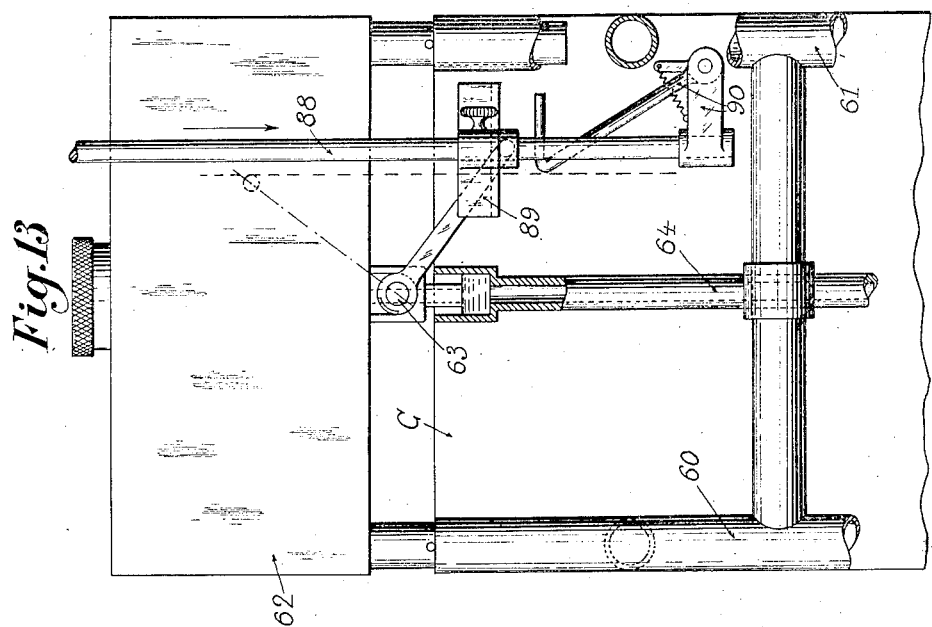
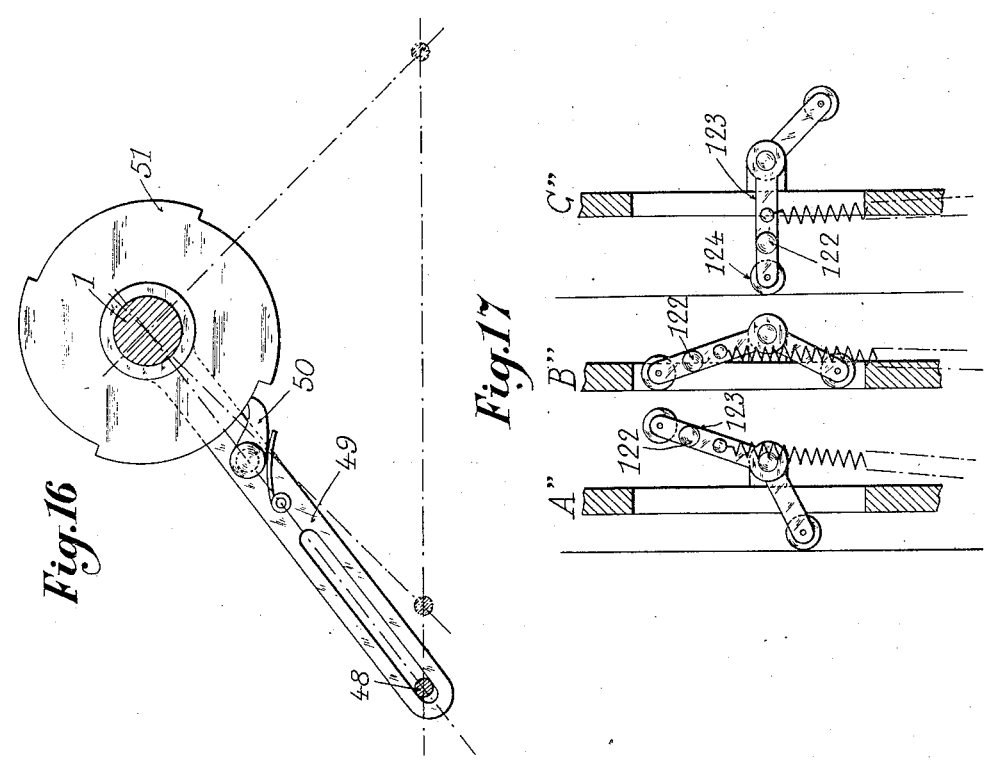

Patented Apr. 6, 1926

1,579,399

UNITED STATES PATENT OFFICE.

GEORGES AUGUSTIN SALINS, OF VINCENNES, FRANCE, ASSIGNOR TO PATHE CINEMA, ANCIENS ETABLISSEMENTS PATHE FRERES, OF PARIS, FRANCE.

MACHINE FOR TREATING CINEMATOGRAPHIC FILMS.

Application filed November 14, 1922. Serial No. 600,798.

*To all whom it may concern:*

Be it known that I, GEORGES AUGUSTIN SALINS, citizen of the French Republic, residing at Vincennes, Seine, in the Republic of France, have invented new and useful Improvements in Machines for Treating Cinematographic Films, of which the following is a specification.

Within recent years there has been brought out in the cinematographic field an operating method of a more or less industrial character which consists in assembling in proper order the different negatives of a given performance and in printing the positive films by means of an apparatus with automatic variations of light, and each film is developed for its whole length at the same time.

But this method of operating did not provide for obtaining films of various tints and toning, as the positives are no longer treated separately as when operating with each negative.

The present invention enables the respective toning and tinting of the positives of a given film and by the continuous travel of the film.

According to the invention, adjacent the receptacle, such as a tank, tube or the like, wherein the film is toned or tinted by a continuous process, is disposed the receptacle containing the solution for the next treatment; the change is effected by holding the beginning of the part of the film to be differently treated, before it enters the first receptacle in order to lower it into the second, so that the colouring of the film will be carried out in succession and without breach of continuity, and when the first receptacle contains no more film, which occurs by reason of the continuous working of the machine, the second receptacle is pushed into the place of the first.

Hitherto, the first part of said operation which consisted in transferring the film into another receptacle has been carried out sufficiently well in current practice, this being done by hand and by inserting a connecting piece between the two parts of the film under different treatments, but means had not been provided for causing said receptacle to occupy the place of the first in order to bring the operation to the same point in all cases.

Other characteristic features of the invention will appear from the following description.

In the accompanying drawings, given by way of example:

Fig. 5 shows the successive positions of the reels in the receptacles and chiefly their position, with the film, at the 40th second of the change;

Fig. 6 is a plan view of the mechanical drive;

Fig. 7 is a view of the four-arm device or spider;

Fig. 8 is a front view of the piece holding the reels in the washing water.

Fig. 8ª is a side view of the same piece.

Figure 3:
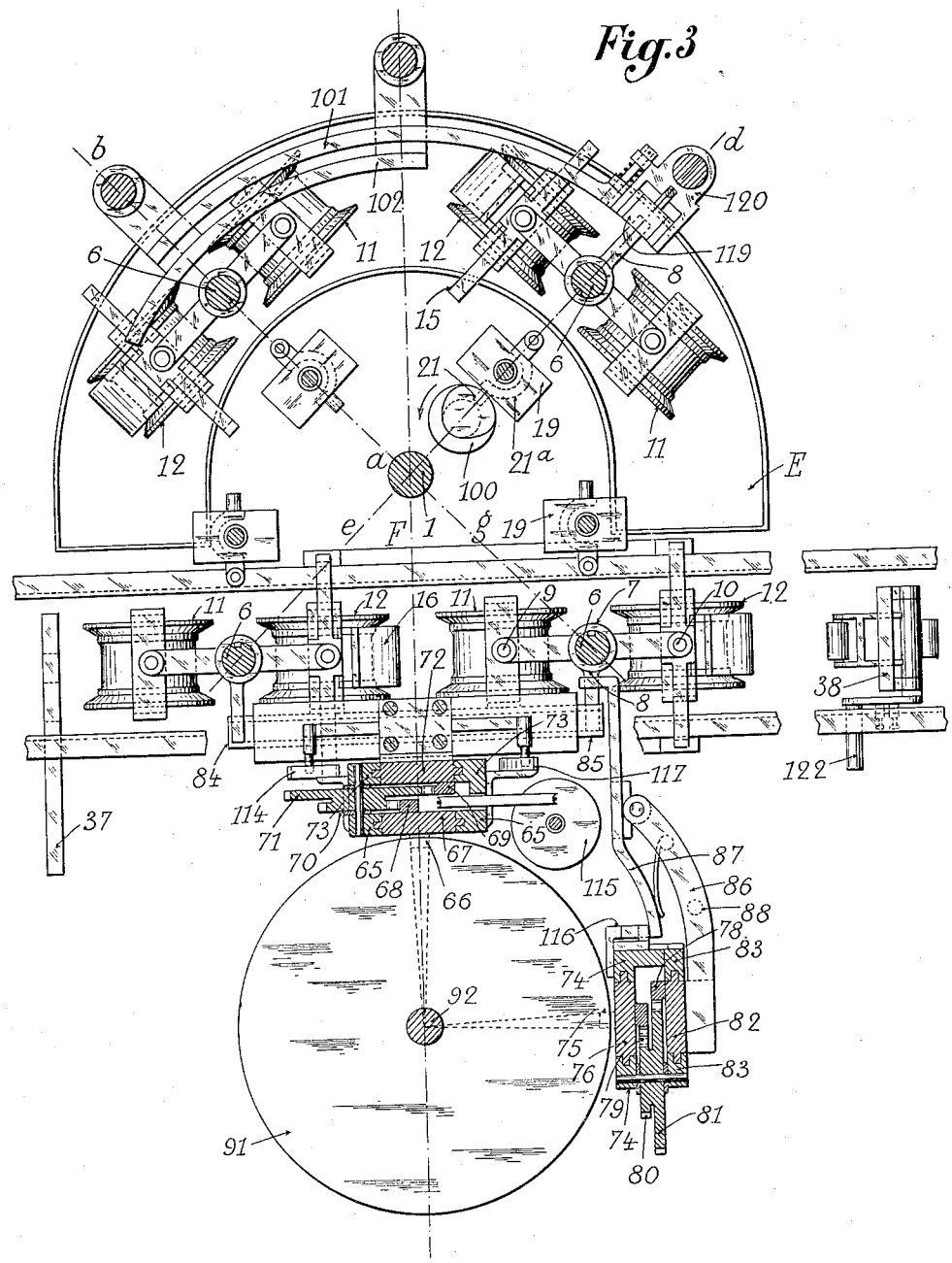
Fig. 3 is a plan view with sections of the guides.

Fig. 9 is an elevational view of the straight cam 116 for the release of lever 87 (Fig. 3).

Fig. 10 is an elevational view of the straight cam 117 for the disappearing of the right-hand bar 85 (Fig. 3).

Fig. 11 is an elevational view of the straight cam 114 for the disappearing of the left hand bar 84 (Fig. 3).

Fig. 12 shows the three successive positions of the rubber wiping device; A' at the 40th second, B' at second 42½ and C' at the 45th second of the change.

Fig. 13 is a view of the upper part of a receptacle with the strengthening tank and the opening and closing device for the cock of said tank.

Fig. 14 is a section of a chain link provided with a tappet.

Fig. 14ª is a side view of said link.

Figure 15:
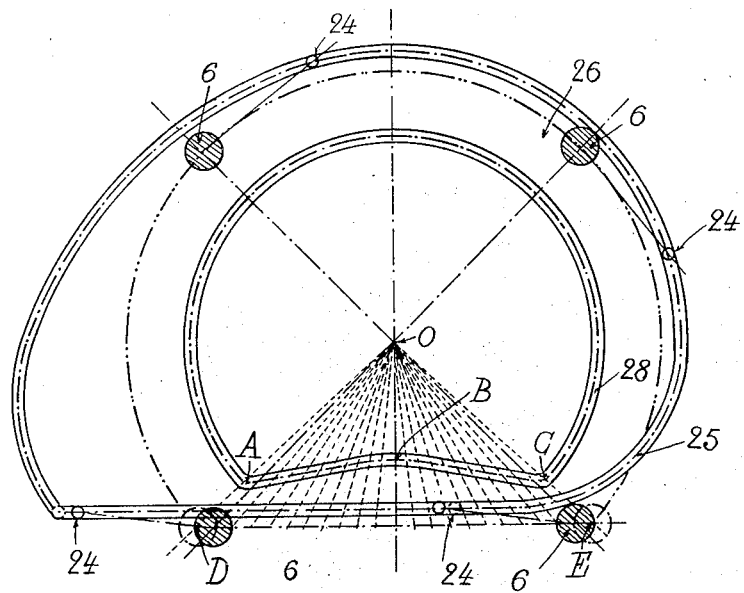

Fig. 15 is a view of the cam giving the angular position of axle 6 (Fig. 2) and the motion of said axle towards or from the right at the 40th and the 45th second, with the method of obtaining the line A—B—C, the line D—E being divided into any suitable number of equal parts, each point obtained is connected with the centre O, and on each line thus drawn, the length A—D is set down, starting from the line D—E. These two cams form but a single piece.

Fig. 16 is a plan view of the circular ratchet device actuating the shaft 1.

Figure 1:
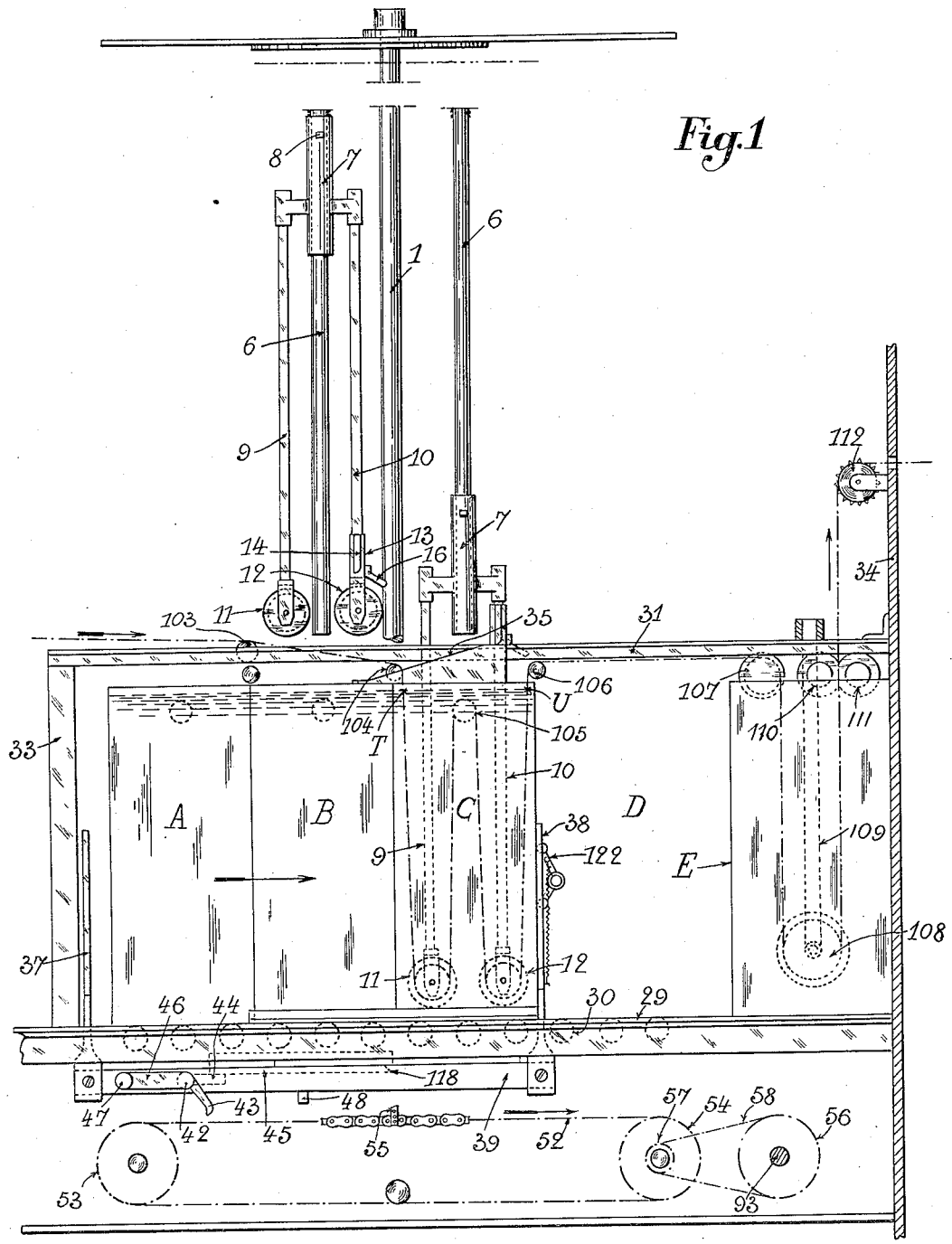
Fig. 1 is an elevational view of the device in normal operation, the double grooved cam for rise and descent of the reels being removed.

Fig. 17 is a view showing the three positions A″ B″ C″ of the rollers mounted on the plate 38, Fig. 1.

According to the example of construction which is shown in a diagrammatic manner in the drawings, the machine is arranged as follows:

At the upper end of a pivot or shaft 1 turning in the bearings 2 and 3, (Fig. 2) is mounted a support 4 provided with four rigid grooved arms forming a turnstile (Fig. 7). On each arm is slidable a piece 5 supporting and guiding a grooved shaft 6 upon which is slidable a sleeve 7 having an arm 8 and a stud, not shown, slidable in the grooved part. To the sleeve 7, (Fig. 1) are secured two rods 9 and 10 each carrying at the lower end a reel 11 and 12.

Figure 2:
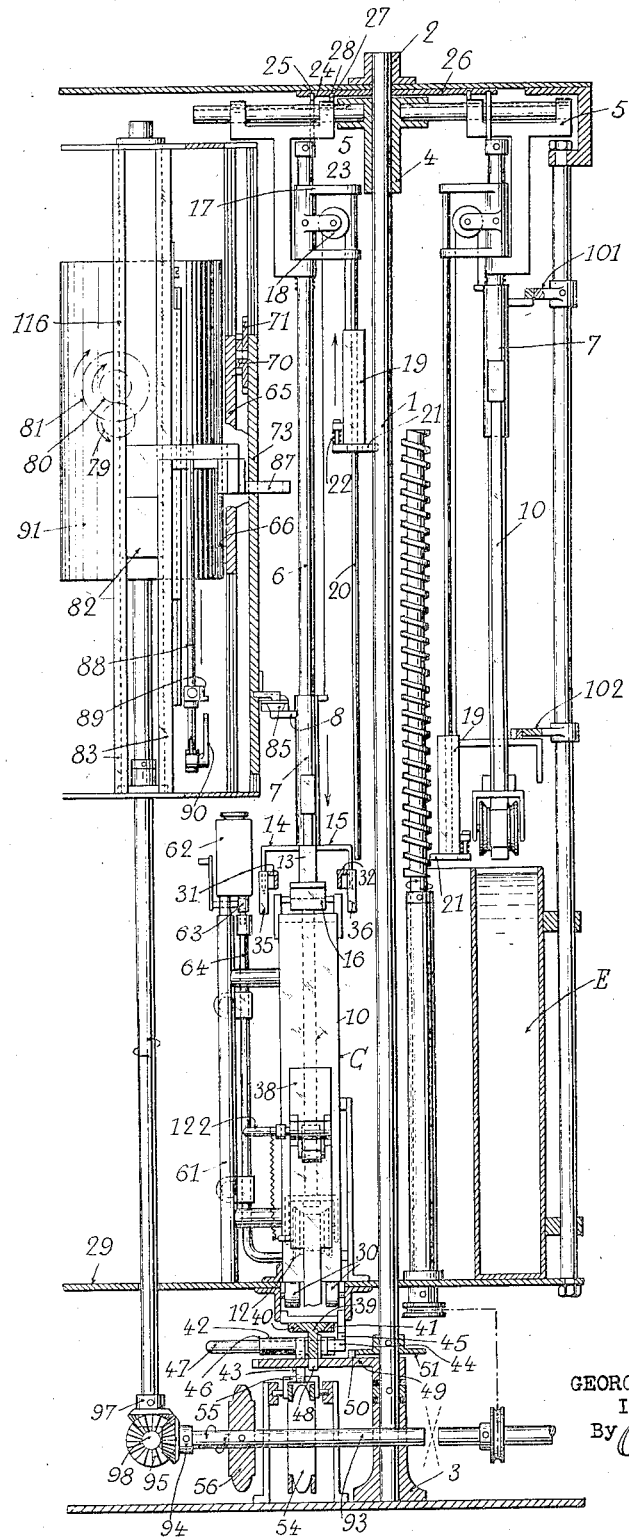
Fig. 2 is a side view relative to the second 42½ of the change, for the part on the left of the pivot, and the 45th second for the part on the right.

The rod 9 (Figs. 1 and 2) is provided upon the whole length with a rubber tube. The rod 10 is provided with an ebonite sheathing of square section having slidable thereon a small sleeve 13 of square section whereon are mounted two arms 14 (Figs. 1, 2 and 12), 15 (Fig. 2) and a small rubber plate 16 forming a wiping device. At the upper part of the shaft 6, (Fig. 2) is mounted the frame 17 carrying the grooved pulley 18 upon which is disposed a cable attached at one end to the sleeve 7 and at the other to the counterweight 19 guided by the rod 20. Each counterweight carries a horizontal roller 21 secured at the end of a hook 21ª (Fig. 3) which is held in its normal position by the spring 22 (Fig. 2). Above the frame 17, the shaft 6 is further provided with a support 23 having mounted thereon the roller 24 slidable in the groove 25 formed in the stationary cam 26, (Figs. 2, 15), producing the angular displacement or rotation of the shaft 6 for giving the pulleys always the proper direction. The piece 5, to enable its movement towards or from the shaft 1, is also provided with a roller 27 slidable in the groove 28 of the same cam 26. Each arm thus arranged constitutes an element.

The body of the device is constituted (Figs. 1 and 2) by a base plate 29 of steel or like material and having a length equal to that of four receptacles with the addition of a small space. Under the receptacles the plate is apertured and is provided with two rows of rollers 30 upon which the receptacles are adapted to slide. Above the plate the uprights 33, 34 (Fig. 1) support the angle bars 31 (Figs. 1, 2, 12), 32 (Fig. 2). Upon each of the latter, is secured a small straight cam 35 (Figs. 2, 12), 36 (Fig. 2) whose use will be set forth hereunder.

The receptacles are held during their forward motion by the vertical plates 37, 38 mounted at the ends of a T-iron member 39 disposed on the line of travel of the receptacles and slidable between the guides 40 and 41. This T-iron member carries a small shaft 42 having mounted thereon the hook 43, a small lever 44 slidable along the straight cam 45 against which it is caused to bear by a spring, not shown, and the lever 46 provided with the handle 47.

The plate 38 carries a device shown in Fig. 17 composed of two rollers adapted to assume the three positions indicated in the figure. The member 39 is also provided with a roller 48 slidable in the grooves formed in the lever 49, Fig. 16, loosely mounted on the shaft 1; this lever is provided with the pawl 50 actuating the ratchet 51 secured to the shaft 1 which is controlled in this manner by the translation of the member 39.

Below the T-iron member, the sprocket chain 52 actuated by the two wheels 53, 54 has disposed on one of its links (Figs. 14 and 14ª) a tappet 55, for actuating the hook 43. The wheel 56 keyed to the driving shaft whereupon is mounted the main clutch (Fig. 6) actuates the pinion 57 by means of the chain 58.

The receptacles which are all exactly alike, consist of a main body (Figs. 1, 2, 13) whereon are disposed two small smooth rollers, one (106) situated at the top and to the right, and the other (105) in the middle plane and immersed in the liquid; in order to provide a better support for the receptacles, uprights 60, 61 are secured therein by connection pieces; a feed reservoir 62 is disposed at the upper part of the uprights and maintains the level of the liquid in the receptacle by means of the cock 63 and tube 64.

Figure 4:
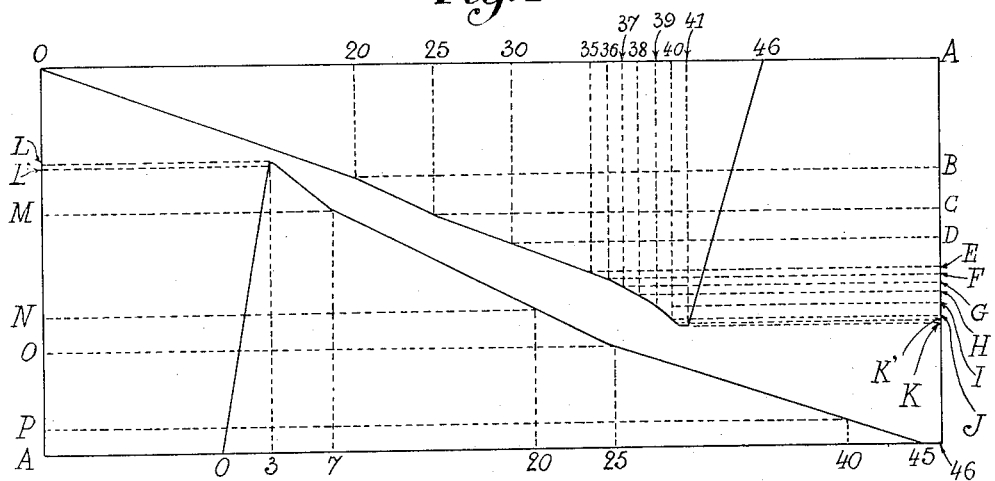
Fig. 4 is a graphic diagram of the operation of the double grooved cams for rise and descent of the reels.

In the apparatus (Figs. 2 and 3) a cylindrical cam 91 the developed surface of which is diagrammatically shown on Fig. 4 with two independent grooves causes the rise and descent in the fixed guides 65 by means of the roller 66 of the carriage 67 provided with a rack 68 which gives the rack 69 having double length a movement in the same direction and at double the speed by means of the two gear wheels 70, 71; this rack 69 is mounted on the carriage 72 which moves in the fixed guides 73 and hence moves over a length which is double the length of movement of the carriage 67. The cylindrical cam 91 also causes the rise and descent in the guides 74 and by means of the roller 75 of the carriage 76 carrying a rack 77 which gives to the rack 78 having double length a movement in the contrary direction and at double the speed by means of the three gear wheels 79, 80, 81. This rack 78 is mounted on the carriage 82 which moves in the fixed guides 83 and hence moves over a length which is double the length of movement of the carriage 76. The reason for the movement of these two racks in opposite directions consists in the necessity of turning one diagram upside down, as shown in Fig. 4 so as to give less height to the cylindrical cam.

On the carriage 72 are disposed the guides for two bars or rulers 84, 85 whereof 84 serves to press upon the arm 8 of the sleeve 7 of the element to be moved downwardly, and 85 serves to hold down the said element when depressed; the carriage 82 supports the arm 86 which holds the rising element by means of the lever 87 and the arm 8, and by means of the rod 88 it opens the feed cock of the receptacle through the medium of the two members 89, 90 (Fig. 13) secured to the lower part of this rod. The cylindrical double grooved cam 91 is secured by a pin to the shaft 92 (Fig. 6) which receives its movement from the driving shaft 93 by means of the bevel gears 94, 95, 96, 97 and the shaft 98.

At the opposite side, the tank E containing running water is used for washing the reels with their rods and the rubber wiping device. The element is caused to descend by a square threaded screw 100; the helical cam 101 enables it to rise at the desired speed, and the rail 102 will retain the square support of said wiping device. Although the washing and wiping of the film are outside of the present question, it may be remarked that a rotary wiping device comprising a pair of cylindrical brushes is preferably used, as it admits of readily changing the part of the film in contact at each change in the dye, as it will be simply necessary to turn the brushes by a certain number of degrees in order that the part to be cleaned shall come into position for washing in the water, as shown in Fig. 1.

In normal operation, the film travels in the colouring device in the following manner. The film is stretched by a weight, not shown, before entering the apparatus; it is preferably wiped off and travels on a smooth roller 103 (Fig. 1) and on the roller 104 of the receptacle which is to be used subsequently, then travels through the receptacle in actual use and over the immersed roller 105, leaves by the roller 106, reaches the roller 107, descends into the water, being held by the reel 108 loosely revoluble on the axle of the rod 109 which is secured at a suitable height, then rises and when at the discharge it passes between two wiping wheels 110, 111 and thence upon the toothed drum 112 used to draw the film, and the latter continues to travel through the rest of the machine. The bleaching and the toning devices are of the same character as the colouring device, but are obviously not provided with subsequent wiping. In normal operation, the spaces A, B, C (Fig. 1) each contain a receptacle, whilst the space D is empty.

When a change is desired, one awaits the arrival of the separation line somewhat above the point T (Fig. 1) this being the point where the film is immersed in the liquid in the receptacle C, and the operator at once actuates the clutch 113 (Fig. 6). The cam 91 then commences to rotate as well as the wheels 54, 53 also driving the chain 52 in the direction shown by the arrow on Fig. 1. The double grooved cam 91 and the chain 52 make a complete turn in forty six seconds, and the duration of the change is forty-five seconds, representing the time taken by any given point of the film to pass in normal running through the receptacle C from T to U, that is, to become bleached, toned or coloured, and it is obvious that the strength of the solution should be determined in consequence.

In the receptacle C, as shown in the diagram of the double grooved cam 91, Fig. 4, the roller 75 descends to point B in 20 seconds, so that the lever 87 will rise through double the length during the same time, retaining the arm 8 of the sleeve 7 which is urged by the weight 19 of the element to be raised. The reels will now be brought to B (Fig. 5). It is in fact this height which would be reached in the same time by free reels, the film continuing to be discharged at U and being held by the hand at T. At the same time, the member 90 mounted on the rod 88, (Figs. 2 and 13) in its upward movement will close the feed cock of C.

For the left hand receptacle B, the roller 66 will rise to L, (Fig. 4) so that the bar 84 (Fig. 3) is located above the arm 8, and the reels do not proceed beyond the point L'; to avoid contact with the said arm when rising, the cam 114 (Figs. 3 and 11) obliges the said bar to enter into the guides at the proper time. The upward movement requires 3 seconds, by reason of the weight 115. From the third to the seventh second, the bar pressing upon the arm 8 will cause the reels to descend to M (level of the liquid) and then to N from the seventh to the twentieth second; at the same time, the wiping device 16 is in the position A' of Fig. 12. The height N is determined by the length of film fed by the roller 103, Fig. 5, for 20 seconds, as measured, from its entrance into the liquid (point R) to the separation line which is always located somewhat above T.

Returning to the right hand receptacle C (Fig. 5) the reels will rise from the 20th to the 25th second to point C, obtained by taking account on the one hand of the discharge of the film through U during this time, in addition to the amount of film raised in order to bring the separation line to point S (flush with the liquid in B). In this position, which is always the position A' of Fig. 12, the wiping device prevents the liquid from C remaining on the film from mixing with the liquid from B. Finally, the reels will raise successively to D, E, F, G, H, I and reach the point J at the 40th second. At this time, the cam 116 will drive back the lever 87 and the coils now released will at once reach the point K'; the lever and the roller 75 after reaching K a short distance above K' will return to the initial point from the 41st to the 46th second. The member 89 mounted on the rod 88 will open the feed cock of the new receptacle in use.

In the left hand receptacle, Fig. 5, from the 20th to the 25th second, the reels will descend to O by the amount of film normally entering by means of the roller 103 added to the length received from C. The film will thus be always well stretched between the two receptacles.

From the 25th to the 45th seconds, the reels descend in a regular manner according to the feed of the film by the roller 103. On the descent, the bar 85 actuated by the straight cam 117 (Figs. 3 and 10) will again enter its guides so as not to come into contact with the arm 8 which is rising at this time, as above stated. As shown in Fig. 5, at the 40th second, the reels are now about to leave the film, and the latter is stretched between the two smooth drums 104 and 106. The forward motion of the receptacles commences at this moment. For this end, the tappet 55 of chain 52 will reach the hook 43 and will drive the same somewhat before the 40th second, thus bringing the plate 37 in the first place near the receptacle A whilst the plate 38 will become separated from the receptacle C which will still be held by the small roller 124 situated at C", Fig. 17, and from the 40th to the 45th second the plate 37 impels the three receptacles from left to right through a distance equal to their length at the normal speed of the film in the machine. The drive is stopped when the lever 44 reaches the point 118 of cam 45 (Fig. 1) and raises the hook 43 whilst the coupling piece continues to travel for one second.

During the sliding movement of said receptacles, the angular displacement of the shaft 1 which is controlled by the translation of the member 39 through the medium of the roller 48, the lever 49 and the ratchet device 50, 51, being equal to 90°, each element will take the place of the preceding; the receptacles A, B, C will travel to the right, thus following the displacement of the reels 11 and 12. In this manner, each element will be successively in service, washed, drained off, or in the waiting position.

The whole portion of film between the two drums 104 and 106 will travel upon drum 106 without any movement of the separation line, and at the 45th second the film is normally discharged from the tank B which has taken the place of the tank C, with the separation line at the front. During this movement, as shown in Fig. 12, the rubber wiping device will be raised to B' and then to C'.

When proceeding from a—e to a—g (Fig. 3) the reels are to move in a straight line, whence the use of the roller 27 slidable in the groove 28 of cam 26, Fig. 15. The angular position of the reels will be determined during the four stages, by the roller 24 slidable in the groove 25 in the same cam.

When the element situated at a—g now reaches a—d, Fig. 3, the roller 21 of the hook disposed at the lower part of the weight 19 (Figs. 2 and 3) when reaching the screw 101 will be raised by the square thread, and the reels can descend by their own weight into the water tank. The arm 8 being held back under the corner of the bar 119 of member 120 (Fig. 8) the reels will be held practically in the fixed position in the tank. The height of the water is sufficient to allow the soiled part of the wiping device which remains attached to the top of the rod by the hooks 121, Fig. 12, to be also washed.

When proceeding to the draining position a—b (Fig. 3) the arm 8 is always held by the helical cam 101 commencing at the piece 120, (Fig. 8) and the element can thus rise without prejudicial shocks. During this time the two arms of the frame of the wiping device will be retained by the curved rail 102 (Figs. 2 and 3) so that said device is in the proper position to subsequently proceed to a—e.

A contact piece which is disposed at any suitable point on the device gives a signal for the end of the change by means of a button 122; whereupon the member 123 (Fig. 17) will be brought from the position C" to the position A", and one then removes the receptacle which was pushed to D, and then by first raising the handle 47 to release the lever 44, the whole device is brought to the left. It is then simply necessary to dispose a new receptacle in the space left empty at A, Fig. 1.

In machines operating at a higher speed than 100 metres per hour, an image counter is preferably disposed in such manner as to provide for the automatic release of the apparatus.

Obviously, in order to avoid the use of a mechanical device and without departing from the spirit of the invention, hand control may be used for actuating the clutch 113 (Fig. 6); or any kind of marks carried by the film may be used for automatically controlling said clutch.

As the device is given by way of example, it might be designed as well for the use of one reel instead of two or even for more than two reels for each element; and this depends upon the speed of the machine on which the device is used; it might also comprise a greater or lesser number of elements.

Having now described my invention, what I claim as new and desire to secure by Letters Patent is:

1. A method whereby the different sections of a cinematographic film may be given the desired colours or tones in a continuous operation, while avoiding the necessity of interposing connecting pieces between the different sections of the film, which consists, when a fresh section of the film is about to enter a first treating receptacle, in stopping the feeding movement of the film into said first receptacle, removing said film from said first receptacle, causing the film to dip into a second treating receptacle, simultaneously displacing both receptacles in order to bring the said second receptacle to the place previously occupied by the said first receptacle, and removing the first receptacle when the film has entirely left the same.

2. A method whereby the different sections of a cinematographic film may be given the desired colours or tones in a continuous operation, while avoiding the necessity of interposing connecting pieces between the different sections of the film, which consists, when a fresh section of the film is about to enter the treating receptacle, in progressively raising the reels upon which the film is guided in a first treating receptacle; lowering at the same time reels upon which the film is adapted to be guided in a second treating receptacle placed before the said first receptacle and displacing both receptacles simultaneously at the travelling speed of the film and in the direction of said travel in order to bring the said second receptacle to the place previously occupied by the said first treating receptacle.

3. A method whereby the different sections of a cinematographic film may be given the desired colours or tones in a continuous operation, while avoiding the necessity of interposing connecting pieces between the different sections of the film, which consists, when a fresh section of the film is about to enter a first treating receptacle, in progressively raising the reels upon which the film is guided in said first treating receptacle; lowering at the same time reels upon which the film is adapted to be guided in a second treating receptacle placed before the said first receptacle and displacing both receptacles simultaneously at the travelling speed of the film and in the direction of said travel in order to bring said second receptacle to the place previously occupied by the said first receptacle, the downward movement of the reels in the said first receptacle and their upward movement in the said second receptacle being so adjusted that the separating line between the section of the film in the said first receptacle and the succeeding section,—which separating line was situated at a point near the level of the liquid in the said first receptacle at the inlet into the latter—is brought backward to the level of the liquid in the said second receptacle at the exit from the latter.

4. An apparatus for treating cinematographic films comprising a first treating receptacle, a second treating receptacle, a washing receptacle, a central vertical shaft, a bracket with radial horizontal arms mounted on said shaft, carriers adapted to slide along said radial arms, respectively, vertical spindles respectively supported by said carriers, operative units adapted to slide along said spindles, each of said units comprising reels upon which the film is guided, means for raising and lowering the said units along said spindles and means for imparting successive angular motions to said central shaft whereby the various units are adapted to cooperate with said receptacles.

5. In combination with the apparatus according to claim 4, stationary cams adapted to control the angular positions of the vertical spindles.

6. In an apparatus according to claim 4, the arrangement in which the means for raising and lowering the said units along said spindles comprise counter-weights and a rotary double grooved cam adapted to cooperate with the two units in the said first and second treating receptacles.

7. In combination with an apparatus according to claim 4, including an arrangement in which the means for raising and lowering the said units along said spindles comprise counterweights and a rotary cam adapted to cooperate with the two units in the auxiliary and treating receptacles, a screw for raising the counterweight of the unit in the washing receptacle, means for rotating said screw, and a helical cam for controlling the rising movement of the said unit in the said washing receptacle.

8. In combination with an apparatus according to claim 4, means for automatically pushing the said first and second treating receptacles by a distance corresponding to one receptacle.

9. In combination with an apparatus according to claim 4, a reserve receptacle and means for pushing the reserve, a first and a second treating receptacles by a distance corresponding to one receptacle, said means comprising a sliding bar, a pusher plate carried by said bar, an endless chain, means for actuating said endless chain, and clutch members for connecting the endless chain to the sliding bar.

10. In combination with an apparatus according to claim 4, means for pushing a first and a second treating receptacles by a distance corresponding to one receptacle, said means comprising a sliding bar, a pusher plate carried by said bar, an endless chain, means for actuating said endless chain and clutch members for connecting the endless chain to the sliding bar, and a ratchet device by means of which the sliding bar is used to impart a step by step movement to the central shaft.

11. In combination with an apparatus according to claim 4, a reserve receptacle, means for pushing the reserve, a first and a second treating receptacles by a distance corresponding to one receptacle, said means comprising a sliding bar, a pusher plate carried by said bar, an endless chain, means for actuating said endless chain and clutch members for connecting the endless chain to the sliding bar, and a ratchet device by means of which the sliding bar is used to impart a step by step movement to the central shaft.

12. In combination with an apparatus according to claim 4, means for pushing a first and a second treating receptacles by a distance corresponding to one receptacle, said means comprising a sliding bar, a pusher plate carried by said bar, an endless chain, means for actuating said endless chain and clutch members for connecting the endless chain to the sliding bar, and a wiping device slidably mounted on each of the operative units and cam members connected to the pusher plate for actuating said wiping devices.

13. In combination with an apparatus according to claim 4, a reserve receptacle, means for pushing the reserve, a first and a second treating receptacles by a distance corresponding to one receptacle, said means comprising a sliding bar, a pusher plate carried by said bar, an endless chain, means for actuating said endless chain and clutch members for connecting the endless chain to the sliding bar and a wiping device slidably mounted on each of the operative units and cam members connected to the pusher plate for actuating said wiping devices.

14. In combination with an apparatus according to claim 4, a reserve receptacle and means for pushing the reserve, a first and a second treating receptacles by a distance corresponding to one receptacle, said means comprising a sliding bar, a pusher plate carried by said bar, an endless chain, means for actuating said endless chain and clutch members for connecting the endless chain to the sliding bar, and an abutment plate connected to the pusher plate and a spring actuated lever mounted on said abutment plate and adapted to hold the first treating receptacle in position during the shifting of the receptacles.

15. In combination with an apparatus according to claim 4, feeding tanks for maintaining a constant level of liquid in the receptacles, cocks on said feeding tanks and means actuated by the raising members for the operative units and adapted to control said cocks.

In testimony whereof I have signed my name to this specification.

GEORGES AUGUSTIN SALINS.